United States Patent
Zhu et al.

(10) Patent No.: US 11,269,344 B2
(45) Date of Patent: Mar. 8, 2022

(54) INFRARED OBSTACLE DETECTION METHOD AND DEVICE, AND ROBOT (71) Applicant: GOERTEK INC., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Shandong (CN)

(*) Notice: Subject to any disclaimer, the term of this patent is extended or adjusted under 35 U.S.C. 154(b) by 1 day.

(21) Appl. No.: 16/303,451

(22) PCT Filed: May 28, 2018

(86) PCT No.: PCT/CN2018/088612
§ 371 (c)(1),
(2) Date: Nov. 20, 2018

(87) PCT Pub. No.: WO2019/056788
PCT Pub. Date: Mar. 28, 2019

(65) Prior Publication Data
US 2021/0223785 A1    Jul. 22, 2021

(30) Foreign Application Priority Data

Sep. 20, 2017  (CN) .......................... 201710855136.4

(51) Int. Cl.
H04N 5/00       (2011.01)
G05D 1/02       (2020.01)
(Continued)

(52) U.S. Cl.
CPC ......... *G05D 1/0242* (2013.01); *G05D 1/0238* (2013.01); *G06F 17/11* (2013.01); *H04N 5/33* (2013.01)

(58) Field of Classification Search
CPC .... G05D 1/0242; G05D 1/0238; G06F 17/11; H04N 5/33; G01S 17/02; G01S 17/93
See application file for complete search history.

(56) References Cited

U.S. PATENT DOCUMENTS 5,841,137 A * 11/1998 Whitney ................... G01J 5/20
                                                    250/338.5
6,028,312 A *  2/2000 Wadsworth ............... G01J 5/24
                                                    250/338.4
(Continued)

FOREIGN PATENT DOCUMENTS

CN    106443688 A    2/2017
CN    107045352 A    8/2017
(Continued)

*Primary Examiner* — Frank F Huang
(74) *Attorney, Agent, or Firm* — Saliwanchik, Lloyd & Eisenschenk (57) ABSTRACT The present invention discloses an infrared obstacle detection method and device and a robot. The method comprises the following steps: controlling an emission module to radiate infrared light to the outside; acquiring first infrared light received by a first reception module and second infrared light received by a second reception module, wherein the first reception module is disposed relative to the emission module such that the first infrared light comprises reflected light obtained by reflecting, by an obstacle, the infrared light radiated by the emission module to the outside and infrared light in ambient light, and the second reception module is disposed relative to the emission module such that the second infrared light is the infrared light in the ambient light; and comparing the first infrared light and the second infrared light, and determining that the obstacle is detected when an energy difference between the first infrared light and the second infrared light is larger than a preset threshold.

14 Claims, 5 Drawing Sheets (51) Int. Cl.
*G06F 17/11* (2006.01)
*H04N 5/33* (2006.01)

(56) References Cited

U.S. PATENT DOCUMENTS

| | | |
|---|---|---|
| 7,411,744 B2 | 8/2008 | Chen |
| 2012/0013745 A1* | 1/2012 | Kang ........................ G06T 7/70 348/164 |
| 2012/0235579 A1* | 9/2012 | Chemel ................... F21S 2/005 315/152 |
| 2017/0245803 A1* | 8/2017 | Ahmed .............. A61B 5/02416 |
| 2018/0007760 A1* | 1/2018 | Ollila ................... H04N 5/2254 |
| 2018/0234603 A1* | 8/2018 | Moore ............... H04N 9/04551 |

FOREIGN PATENT DOCUMENTS

| | | |
|---|---|---|
| CN | 107621641 A | 1/2018 |
| CN | 207301332 U | 5/2018 |
| WO | 2009060542 A1 | 5/2009 |

* cited by examiner

INFRARED OBSTACLE DETECTION METHOD AND DEVICE, AND ROBOT

CROSS REFERENCE TO RELATED APPLICATIONS

This application is a National Stage of International Application No. PCT/CN2018/088612, filed on May 28, 2018, which claims priority to Chinese Patent Application No. 201710855136.4, filed on Sep. 20, 2017, both of which are hereby incorporated by reference in their entireties.

TECHNICAL FIELD

The present invention relates to the technical field of obstacle detection, and in particular, to an infrared obstacle detection method, an infrared obstacle detection device and a robot.

BACKGROUND

An infrared detection device which is used for near-distance obstacle detection is widely used in various civil robots, such as a reception robot, a food delivery robot, a companion robot and a sweeping robot, to achieve automatic obstacle avoidance of the robots.

The existing infrared obstacle detection device comprises an emission module and a reception module. The emission module is configured to radiate infrared light to the outside. The radiated infrared light is reflected by an obstacle, and then received by the reception module. The reception module may be turned on by receiving the infrared light, in order to determine the presence of the obstacle in front.

The problem existing in this infrared obstacle detection device in practical use is that: a detection result is invalid due to the influence of ambient light. This is reflected in that: because the ambient light usually includes sunlight and the sunlight contains abundant broadband light waves and has both visible light energy and infrared light components, the reception module may be turned on by receiving the infrared light components in the ambient light, which results in an erroneous detection result of the detected obstacle. Therefore, it is very necessary to provide a new technical solution for detecting an obstacle based on infrared light, so as to reduce the influence of the infrared light in the ambient light on a detection result.

SUMMARY

An objective of an embodiment of the present invention is to provide a new technical solution for detecting an obstacle based on infrared light.

According to a first aspect of the present invention, there is provided an infrared obstacle detection method, comprising the following steps:

controlling an emission module to radiate infrared light to the outside;

acquiring first infrared light received by a first reception module and second infrared light received by a second reception module, wherein the first reception module is disposed relative to the emission module such that the first infrared light comprises reflected light obtained by reflecting, by an obstacle, the infrared light radiated by the emission module to the outside and infrared light in ambient light, and the second reception module is disposed relative to the emission module such that the second infrared light is the infrared light in the ambient light; and comparing the first infrared light and the second infrared light, and determining that the obstacle is detected when an energy difference between the first infrared light and the second infrared light is larger than a preset threshold.

According to a second aspect of the present invention, there is provided an infrared obstacle detection device, comprising:

an emission module configured to radiate infrared light to the outside;

a first reception module configured to receive first infrared light, wherein the first reception module is disposed relative to the emission module such that the first infrared light comprises reflected light obtained by reflecting, by an obstacle, the infrared light radiated by the emission module to the outside and infrared light in ambient light;

a second reception module configured to receive second infrared light, wherein the second reception module is disposed relative to the emission module such that the second infrared light is the infrared light in the ambient light; and a detection module configured to compare the first infrared light and the second infrared light, and determine that the obstacle is detected when an energy difference between the first infrared light and the second infrared light is larger than a preset threshold.

According to a third aspect of the invention, there is provided a robot which comprises the infrared obstacle detection device according to the second aspect.

A beneficial effect of the present invention lies in that: according to infrared obstacle detection method and the infrared obstacle detection device of the embodiments of the present invention, by arranging the second reception module configured to receive infrared light in ambient light and taking an energy value of the infrared light received by the second reception module as a reference, whether the infrared light received by the first reception module includes reflected light obtained by reflecting, by the obstacle, the infrared light radiated by the emission module to the outside is determined, thereby further determining whether the obstacle is detected. Therefore, according to the method and the device of the embodiments of the present invention, the adverse effect of the infrared light in the ambient light on the obstacle detection based on the infrared light received by the first reception module can be avoided, and the accuracy of infrared obstacle detection is effectively improved.

BRIEF DESCRIPTION OF THE DRAWINGS

The drawings that are constitute a part of the description show the embodiments of the present invention and are intended to explain the principle of the invention together with the descriptions thereof.

DETAILED DESCRIPTION

Now, various embodiments of this invention will be described in detail with reference to the drawings. It should be noted that, unless specified otherwise, the relative arrangements of the members and steps, the mathematical formulas and numerical values described in these embodiments do not restrict the scope of the present invention.

The following descriptions for at least one embodiment are actually descriptive only, and shall not be intended to limit the present invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

<Method Embodiment>

Figure 1:
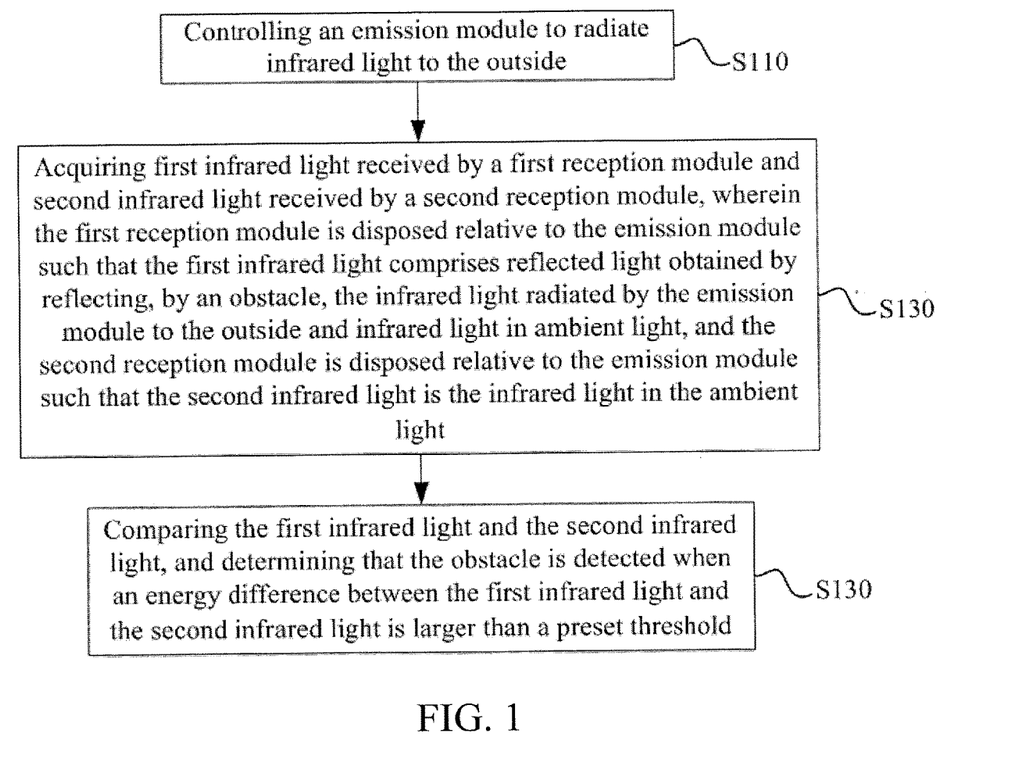
FIG. 1 is a schematic flowchart of an infrared obstacle detection method according to an embodiment of the present invention.

FIG. 1 is a schematic flowchart of an infrared obstacle detection method according to an embodiment of the present invention.

As shown in FIG. 1, the infrared obstacle detection method according to the embodiment of the present invention may comprise the following steps S110-S130.

In step S110, an emission module is controlled to radiate infrared light to the outside.

This control may be energization control, e.g., power-on, of the emission module through a power switch. The emission module starts working under the action of a power supply circuit and remains in a working state until the power supply is powered off.

This control may also be implemented by a processor. For example, the processor is electrified to control the emission module to be powered-on to work. Alternatively, for example, the processor controls the emission module to be powered-on to work according to an external trigger, etc.

The emission module may comprise at least one infrared LED.

In step S120, first infrared light received by a first reception module and second infrared light received by a second reception module are acquired. The first reception module is disposed relative to the emission module such that the first infrared light comprises infrared light in ambient light and reflected light, the reflected light is obtained by reflecting, by an obstacle, the infrared light radiated by the emission module to the outside The second reception module is disposed relative to the emission module such that the second infrared light is the infrared light in the ambient light.

Each of the first reception module 220 and the second reception module 230 may comprise at least one infrared reception LED.

In step S130, the first infrared light is compared with the second infrared light, and it is determined that the obstacle is detected when an energy difference between the first infrared light and the second infrared light is larger than a preset threshold.

The preset threshold may be set according to a detected tolerance requirement, wherein the higher the preset threshold is, the higher the obstacle determination accuracy is. However, at the same time, the accuracy of determining that no obstacle is detected will be reduced.

The energy of the infrared light refers to energy carried by infrared photons. For example, the energy of the infrared light may be represented by the intensity of an electric signal through energy conversion.

The method according to the embodiment of the present invention may be performed by a hardware circuit, or may also be performed by controlling a processor to operate via an instruction stored in a memory, or may also be performed under the cooperation of the hardware circuit and the instruction.

In the method according to the embodiment of the present invention, in addition to setting the first reception module for receiving the reflected light obtained by reflecting, by the obstacle, the infrared light radiated by the emission module to the outside, the second reception module is further provided to receive the infrared light in the ambient light as the second infrared light. Because the second reception module and the first reception module are located under the same ambient light condition, the energy of the infrared light in the ambient light received by the first reception module and the energy of the infrared light in the ambient light received by the second reception module are substantially the same. Therefore, according to the method of the embodiment of the present invention, by using the energy value of the infrared light received by the second reception module as a reference, whether the infrared light received by the first reception module includes the reflected light obtained by reflecting, by the obstacle, the infrared light radiated by the emission module to the outside may be determined, thereby further determining whether the obstacle is detected. It can thus be seen that, according to the method of the embodiments of the present invention, the adverse effect of the infrared light in the ambient light on the obstacle detection based on the infrared light received by the first reception module can be avoided, and the accuracy of infrared obstacle detection is effectively improved.

In an embodiment of the present invention, said step S130 in which the first infrared light is compared with the second infrared light, and it is determined that the obstacle is detected when an energy difference between the first infrared light and the second infrared light is larger than a preset threshold comprises the following sub-steps S131-S132.

In sub-step S131, a receiving voltage value indicating an energy value of the first infrared light and a reference voltage value indicating an energy value of the second infrared light are acquired.

In step S131, the first reception module and the second reception module may generate a photocurrent in the case of receiving the infrared light, wherein the stronger the energy of the received infrared light is, the higher the photocurrent is. Therefore, it is possible to provide the receiving voltage value indicating the energy value of the first infrared light by detecting the magnitude of the photocurrent generated by the first reception module, and provide the reference voltage value indicating the energy value of the second infrared light by detecting the magnitude of the photocurrent generated by the second reception module.

For example, when the first reception module is connected with a reception sampling resistor in series, a voltage value at each of two ends of the reception sampling resistor is directly proportional to a current value of the photocurrent generated by the first reception module, and the voltage value may be used as the receiving voltage value indicating the energy value of the first infrared light.

Alternatively, for example, when the second reception module is connected with a reference sampling resistor in series, a voltage value at each of two ends of the reference sampling resistor is directly proportional to a current value of the photocurrent generated by the second reception module, and the voltage value may be used as the reference voltage value indicating the energy value of the second infrared light.

In step S132, the receiving voltage value is compared with the reference voltage value, and a signal indicating that an obstacle is detected is output when the receiving voltage value is larger than the reference voltage value.

The signal may be a level signal, such as a high level signal or a low level signal.

This level signal may be further output to a control circuit for the control circuit to perform a movement control according to the level signal.

In an example in which the processor is controlled to perform this step S132 via an instruction stored in a memory, this signal may also be an instruction signal inside the processor. The processor may further directly perform a movement control according to the instruction signal.

According to the method of the embodiment of the present invention, the voltage value is used to represent the energy value of the infrared light, thereby facilitating improving the design flexibility of the implementation device. For example, the voltage comparison step may be performed by a voltage comparator or a processor.

In an embodiment of the present invention, the method according to the embodiment of the present invention may further comprise a step S140.

In step S140, the energy value of the second infrared light is detected, and a signal indicating the failure of infrared obstacle detection is output when the energy value exceeds a set energy value upper limit.

This signal may be a level signal, such as a high level signal or a low level signal.

This level signal may be further output to the control circuit for the control circuit to perform at least one of the following subsequent processes according to the failure of the infrared obstacle detection: selecting other path planning schemes, powering off the infrared obstacle detection device, performing an alarm notification for the failure of the infrared obstacle detection, etc.

In an example in which the processor is controlled to perform this step S140 via an instruction stored in a memory, this signal may also be an instruction signal inside the processor. The processor may further perform at least one of the subsequent processes according to the instruction signal.

The energy value upper limit may be determined experimentally. For example, the intensity of the ambient light is gradually increased in an experiment, and at the same time whether the set obstacle is detected by the method according to the embodiment of the present invention is observed to determine the energy value upper limit based on a critical point where the obstacle cannot be detected.

In addition, since the infrared light in the ambient light, which serves as a reference for obstacle detection, is introduced into the method of the embodiment of the present invention, it is demonstrated that that the method of the embodiment of the present invention can effectively avoid the influence of the ambient light on the detection result under normal illumination conditions. Therefore, the failure of the infrared obstacle detection mainly occurs when the energy value of the second infrared light exceeds an energy value of the reflected light from the obstacle, in particular, when the energy value of the second infrared light far exceeds the energy value of the reflected light from the obstacle such that the energy value of the reflected light in the first infrared light is negligible relative to the total energy value of the first infrared light. In this regard, in this embodiment of the present invention, the energy value upper limit may also be set according to an emission power of the emission module and the sensing sensitivity of the first reception module.

According to the method of this embodiment of the present invention, the effective application range of the infrared obstacle detection is limited by detecting whether the energy value of the second infrared light exceeds the set energy value. On the one hand, the accuracy of the infrared obstacle detection may be ensured, and on the other hand, the control circuit can perform the subsequent process according to the signal indicating the failure of the infrared obstacle detection, so as to ensure the normal operation of a moving object carrying the infrared obstacle detection device.

In an embodiment of the present invention, said step S140 in which the energy value of the second infrared light is detected, and a signal indicating the failure of infrared obstacle detection is output when the energy value exceeds a set energy value upper limit may further comprise:

step S141, acquiring a reference voltage value indicating the energy value of the second infrared light; and step S142, outputting a signal indicating the failure of the infrared obstacle detection when the reference voltage value exceeds a set voltage value upper limit.

The voltage value upper limit is a specific example of the energy value upper limit. The voltage value upper limit may be set by referring to the method of setting the energy value upper limit.

According to the method of this embodiment of the present invention, the reference voltage value is used to represent the energy value of the second infrared light, thereby facilitating improving the design flexibility of the implementation device. For example, the voltage comparison step may be performed by a voltage comparator or a processor.

<Device Embodiment>

Figure 2:
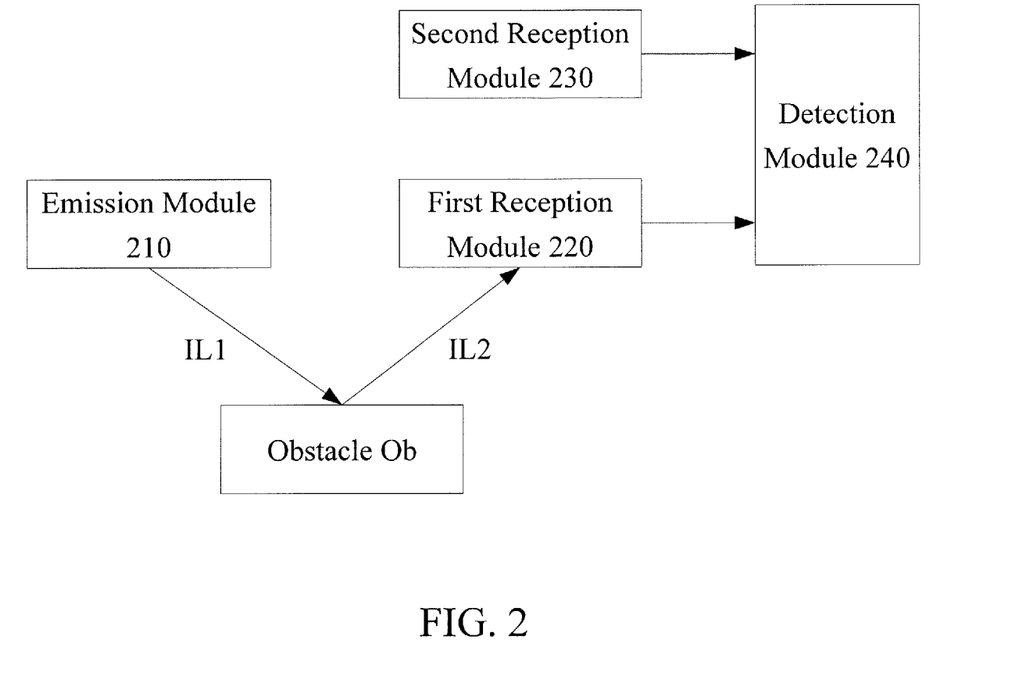
FIG. 2 is a schematic block diagram of an infrared obstacle detection device according to an embodiment of the present invention.

FIG. 2 is a schematic block diagram of an infrared obstacle detection device according to an embodiment of the present invention.

As shown in FIG. 2, the infrared obstacle detection device according to the embodiment of the present invention comprises an emission module 210, a first reception module 220, a second reception module 230 and a detection module 240.

The emission module 210 is configured to radiate infrared light IL1 to the outside.

The first reception module 220 is configured to receive first infrared light. The first reception module 220 is disposed relative to the emission module 210 such that the first infrared light comprises reflected light IL2 obtained by reflecting, by an obstacle Ob, the infrared light IL1 radiated by the emission module 210 to the outside, and infrared light in ambient light (not shown).

The second reception module 230 is configured to receive second infrared light. The second reception module 230 is disposed relative to the emission module 210 such that the second infrared light is the infrared light in the ambient light (not shown).

The detection module 240 is configured to compare the first infrared light and the second infrared light, and determine that the obstacle is detected when an energy difference between the first infrared light and the second infrared light is larger than a preset threshold.

According to the device of this embodiment of the present invention, by using the energy value of the infrared light received by the second reception module 230 as a reference, whether the infrared light received by the first reception module 220 includes the reflected light IL2 is determined, thereby further determining whether the obstacle is detected. It can thus be seen that, according to the device of this embodiment of the present invention, the adverse effect of the infrared light in the ambient light on the obstacle detection based on the infrared light received by the first reception module 220 can be avoided, and the accuracy of infrared obstacle detection is effectively improved.

Further, according to the device of the embodiment of the present invention, the first reception module 220 and the second reception module 230 which are identical completely may be used, that is, both of which have the same performance parameters, such that the validity of the infrared light in the ambient light received by the second reception module 230 as a reference may be improved.

Figure 3:
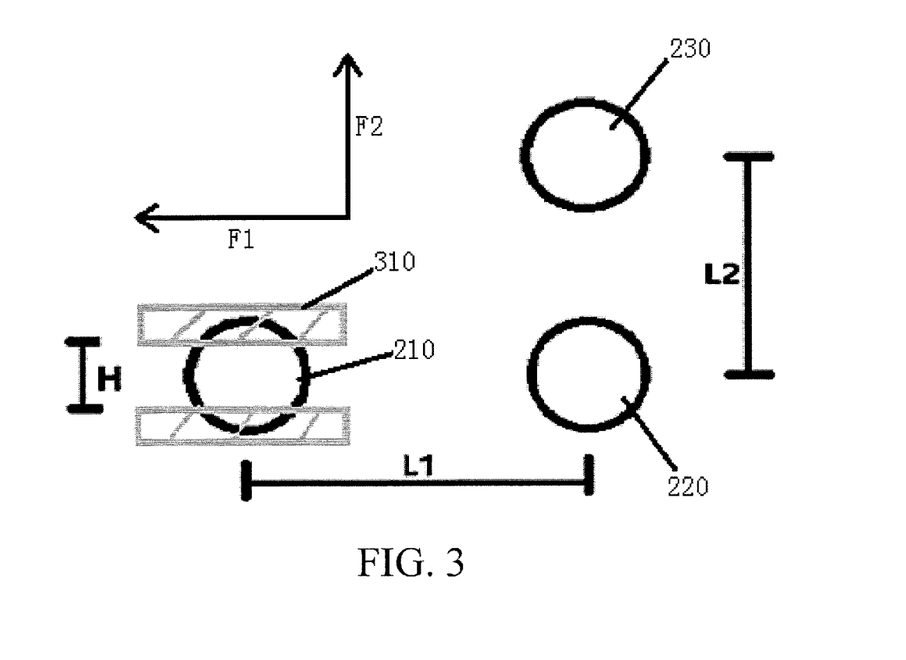
FIG. 3 is a schematic diagram of an arrangement structure of the infrared obstacle detection device according to the embodiment of the present invention.

FIG. 3 is a schematic diagram of an arrangement structure of the infrared obstacle detection device according to the embodiment of the present invention.

As shown in FIG. 3, in this embodiment of the present invention, the emission module 210 and the first reception module 220 may be arranged side by side in a first direction F1.

The side-by-side arrangement in the first direction F1 includes: setting a direction of a connection line between a light emitting point of the emission module 210 and a light reception point of the first reception module 220 as the first direction F1.

The first reception module 220 and the second reception module 230 are arranged side by side in a second direction F2, wherein the first direction F1 is perpendicular to the second direction F2.

The side-by-side arrangement in the second direction F2 includes: setting a direction of a connection line between a light reception point of the first reception module 220 and a light reception point of the second reception module 230 as the second direction F2.

According to this embodiment of the present invention, it is beneficial to ensure the amount of the reflected light IL2 received by the first reception module 220 and reduce the amount of other infrared light except the infrared light in the ambient light received by the second reception module 230 as much as possible. The other infrared light includes the infrared light IL1 radiated by the emission module 210 to the outside, and the reflected light IL2 reflected by the obstacle. At the same time, the similarity of the ambient lights in environments where the first reception module 220 and the second reception module 230 are located respectively is improved, thereby improving the validity of using the second infrared light received by the second reception module 230 as a reference.

Further, the first reception module 220 and the second reception module 230 may have the same orientation, and hereby receive the infrared light in the ambient light at the substantially same angle, such that the validity of using the second infrared light received by the second reception module 230 as a reference for obstacle detection may be further improved.

The emission module 210 and the first reception module 220 may have the same orientation, or different orientations.

The orientation of the first reception module 220 may be set to have a maximum reception area for receiving the reflected light IL2.

The orientation of the emission module 210 and the orientation of the first reception module 220 may be set according to a shape of a surface of a bearing object.

For example, the shape of the surface where the emission module 210 and the first reception module 220 are located is set as a plane, and the emission module 210 and the first reception module 220 may have the same orientation.

Alternatively, for example, the shape of the surface where the emission module 210 and the first reception module 220 are located is set as a curved surface, such as a circular arc, and then the emission module 210 and the first reception module 220 may also be in different orientations. For example, the orientations of the emission module 210 and the first reception module 220 may be a normal direction of the surface where the emission module 210 and the first reception module 220 are located.

Figure 4:
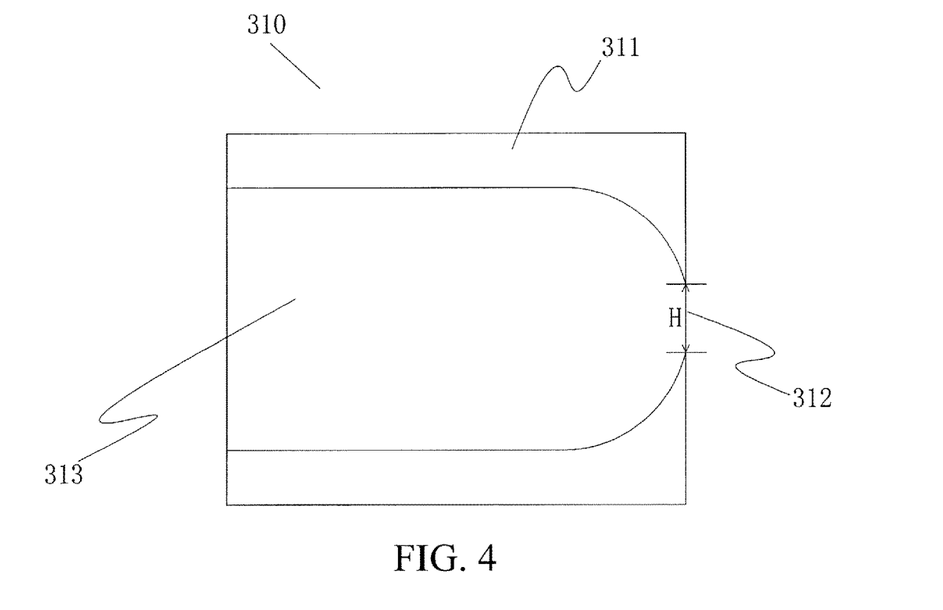
FIG. 4 is a schematic structural diagram of a mounting base of the infrared obstacle detection device according to the embodiment of the present invention.
Figure 5:
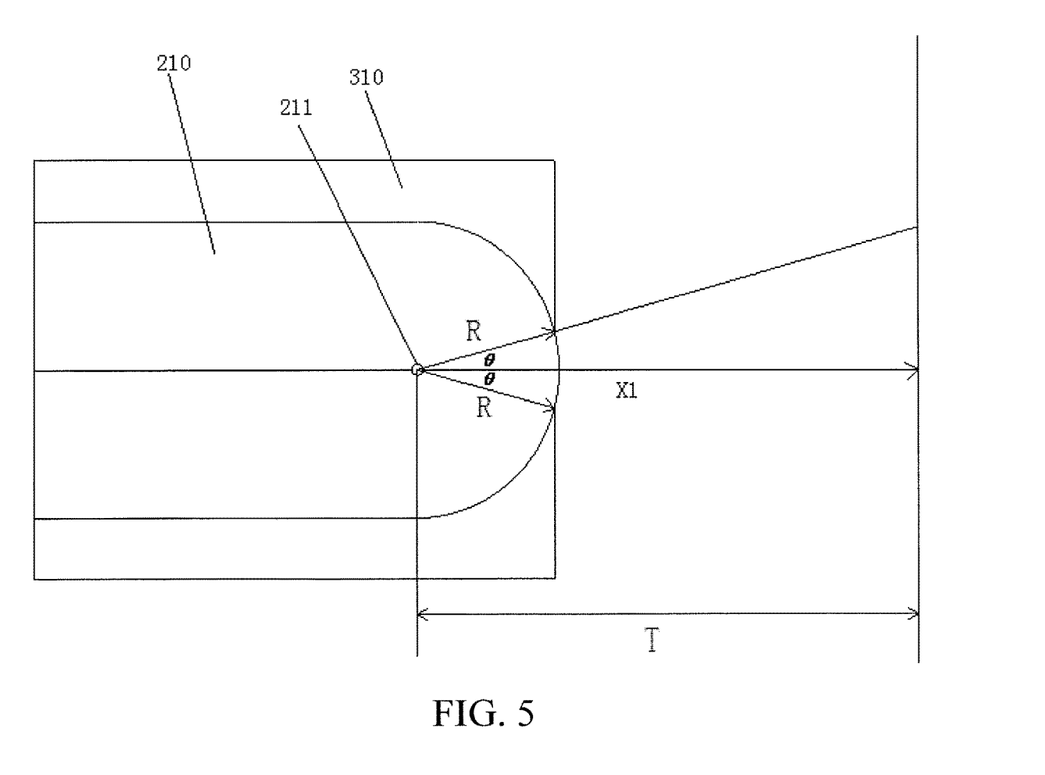
FIG. 5 is a schematic diagram of a light shielding structure of the infrared obstacle detection device according to the embodiment of the present invention.

FIG. 4 is a schematic structural diagram of a mounting base of the infrared obstacle detection device according to the embodiment of the present invention. FIG. 5 is a schematic diagram of a light shielding structure formed by mounting the emission module in the mounting base, in which the light shielding structure in FIG. 5 refers to a left view of the light shielding structure shown in FIG. 3.

As shown in FIGS. 3 to 5, the device according to this embodiment of the present invention may further comprise a mounting base 310. The mounting base 30 comprises a light shielding portion 311 and a light transmission portion 312. The emission module 210 is mounted in the mounting base 310, for example, in an inner cavity 313 of the mounting base 310.

The emission module 210 irradiates the infrared light IL1 to the outside through the light transmission portion 312. The light shielding portion 311 is used to limit a radiation range (angle range of radiation) of the emission module 210 in the second direction F2.

According to this embodiment of the present invention, the light shielding structure of the emission module 210 in the second direction F2 can be formed by the light shielding portion 311 of the mounting base 310, such that the second reception module 230 and the first reception module 220 are set to have a smaller spacing L2 in the second direction F2 under the condition of avoiding the second reception module 230 from receiving other infrared light as much as possible, such that the validity of using the second infrared light received by the second reception module 230 as a reference for obstacle detection may be further improved.

In an embodiment of the present invention, referring to FIGS. 3 to 5, a dimension H between two end points (i.e., opening edges) of the light transmission portion 312 in the second direction F2 may be set as:

$$H \leq 2 \times R \times \sin\theta \qquad \text{Formula (1).}$$

In the above formula, $\theta$ is a half power angle of the emission module 210; R is a length of a line segment between a light emission point 211 of the emission module 210 and each of the end points of the light transmission portion 312 in the second direction F2, wherein an included angle between the line segment direction and an optical axis direction X1 of the light emission point (i.e., a light source point) of the emission module 210 is the half power angle θ.

The optical axis of the emission module 210 refers to a straight line of a radiation energy distribution center, i.e., the optical axis direction X1 is a direction in which the emission module 210 generates the maximum radiation energy. The optical axis direction of the emission module 210 is also referred to as a normal direction of the emission module 210.

The half power angle θ is an included angle between a light beam direction in which the luminous power is a half of the luminous power in the optical axis direction X1 and the optical axis direction X1. It should be noted that, in the optical axis direction, the radiation energy of a light beam generated by the emission module 210 is strongest. The included angle between the light beam direction and the optical axis direction gradually increases from the optical axis direction to the half power angle direction. The radiation energy of the corresponding light beam will be weakened gradually.

According to this embodiment of the present invention, by setting the dimension H≤2×R×sin θ, a distance L2 between the second reception module 230 and the first reception module 220 in the second direction F2 may be controlled within 10 cm (including 10 cm). This distance may ensure that the energy of the infrared light in the ambient light received by the first reception module 220 and the energy of the infrared light in the ambient light received by the second reception module 230 are substantially the same.

In an embodiment of the present invention, referring to FIGS. 3 to 5, a dimension H between two end points of the light transmission portion 312 in the second direction F2 may be set as: H=2×R×sin θ.

Further, a spacing L2 between the first reception module 220 and the second reception module 230 in the second direction F2 is set as:

$$2 \times T \times \tan \theta \leq L2 \leq 4 \times T \times \tan \theta \quad \text{Formula (2)}.$$

In the Formula (2), T is a farthest detection distance of an infrared obstacle detection module relative to an obstacle Ob, and the infrared obstacle detection module is composed of the first reception module and the emission module.

The farthest detection distance T may be obtained experimentally. In an experiment, the device may be arranged in an experimental environment where there is no ambient light influence. By gradually increasing the distance between the obstacle and the emission module 210, whether the first reception module 220 responds is observed, and a critical value in the case of the response is calibrated as the farthest detection distance T. That is, the farthest detection distance is a farthest distance that the first reception module 220 can make a response to an infrared light reflected by the obstacle and radiated by the emission module, i.e. a critical value.

The farthest detection distance T may also be determined based on performance parameters of an existing infrared sensor (comprising only a transmission module and a first reception module) with the same performance. The farthest detection distance is an important performance parameter of the infrared sensor.

According to this embodiment of the present invention, it can maximize the energy of the infrared light radiated by the emission module 210 to the outside under the precondition of ensuring that the energy of the infrared light in the ambient light received by the first reception module 220 and the energy of the infrared light in the ambient light received by the second reception module 230 are substantially the same, which will be conducive to improving the accuracy of infrared obstacle detection.

In an embodiment of the present invention, referring to FIGS. 3 to 5, a dimension H between two end points of the light transmission portion 312 in the second direction F2 may be set as: H=2×R×sin θ.

A spacing L2 between the first reception module 220 and the second reception module 230 in the second direction F2 is set as: 2×T×tan θ≤L2≤4×T×tan θ.

In the meantime, a spacing L1 between the emission module 210 and the first reception module 220 in the first direction F1 may be set as: 3×≤R≤L1≤6×R.

As known from the obstacle detection principle of infrared obstacle detection, the smaller the distance L1 is, the larger the farthest detection distance T is.

According to this embodiment of the present invention, the device may have the following performances of: having an appropriate farthest detection distance T and an appropriate radiation power, ensuring an isolation of the second reception module 230 from the emission module 210, guaranteeing the validity of using the second infrared light as a reference, and the like.

Figure 6:
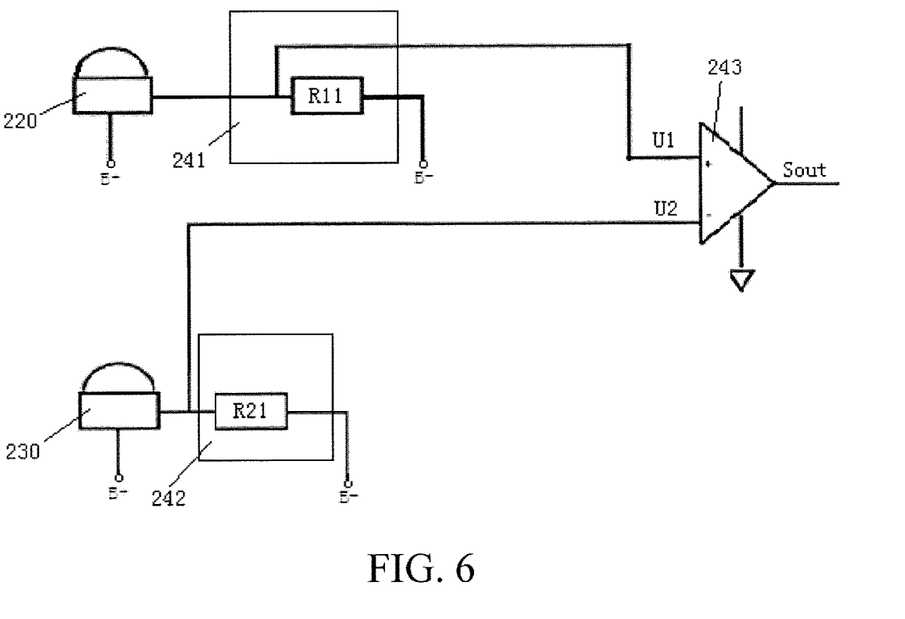
FIG. 6 is a schematic circuit diagram of the infrared obstacle detection device according to the embodiment of the present invention.

FIG. 6 is a schematic circuit diagram of the infrared obstacle detection device according to the embodiment of the present invention.

As shown in FIG. 6, the detection module 240 comprises a voltage comparison circuit 243, a first reception processing circuit 241 connected to a first signal input end of the voltage comparison circuit 243, and a second reception processing circuit 242 connected to a second signal input end of the voltage comparison circuit 243.

The first reception processing circuit 241 is configured to convert an energy value of the first infrared light received by the first reception module 220 into a receiving voltage value U1 and output the receiving voltage value to the voltage comparison circuit 243.

The second reception processing circuit 242 is configured to convert an energy value of the second infrared light received by the second reception module 230 into a reference voltage value U2 and output the reference voltage value U2 to the voltage comparison circuit 243.

The first reception processing circuit 241 comprises a reception sampling resistor R11 whose first end is connected to one end of the first reception module 220 and whose second end is connected to a cathode B− of a power supply source. The other end of the first reception module 220 is connected to an anode B+ of the power supply source to form a first current loop, wherein the cathode B− of the power supply source is grounded.

In the first current loop, a voltage value at each of two ends of the reception sampling resistor R11 is directly proportional to a current value of a photocurrent generated by the first reception module 220. Therefore, the first end of the reception sampling resistor R11 is also connected to a first signal input end of the voltage comparison circuit 243, such that the voltage value at each of two ends of the reception sampling resistor R11 is used as a receiving voltage value and output to the voltage comparison circuit 243.

The second reception processing circuit 242 comprises a reference sampling resistor R21 whose first end is connected to one end of the second reception module 230 and whose second end is connected to the cathode B− of the power supply source. The other end of the second reception module 230 is connected to the anode B+ of the power supply source to form a second current loop.

In the second current loop, a voltage value at each of two ends of the reference sampling resistor R21 is directly proportional to a current value of a photocurrent generated by the second reception module 230. Therefore, the first end of the reference sampling resistor R21 is also connected to a second signal input end of the voltage comparison circuit 243, such that the voltage value at each of two ends of the reception sampling resistor R21 is used as a reference current value U2 and output to the voltage comparison circuit 243.

The voltage comparison circuit 243 is configured to compare the receiving voltage value U1 and the reference voltage value U2, and output a level signal indicating that an obstacle is detected when the receiving voltage value is larger than the reference voltage value.

The voltage comparison circuit 243 may be a voltage comparator.

The first signal input end and the second signal input end of the voltage comparison circuit 243 are a non-inverting input end and an inverting input end of the voltage comparator, respectively.

The voltage comparison circuit 243 may be a processor.

In an example, a first signal input end and a second signal output end of the processor are AD ports. The first end of the reception sampling resistor R11 is directly connected to the first signal input end of the voltage comparison circuit 243. The first end of the reference sampling resistor R21 is directly connected to the second signal input end of the voltage comparison circuit 243.

In another example, the processor is not provided with an AD port. The first end of the reception sampling resistor R11 may be connected to the first signal input end of the voltage comparison circuit 243 through an external AD conversion circuit. The first end of the reference sampling resistor R21 is connected to the second signal input end of the voltage comparison circuit 243 through another external AD conversion circuit.

According to the device of the embodiment of the present invention, the design flexibility of the detection module may also be improved by using the voltage value to represent the energy value of the infrared light and performing a design relatively advantageous to simplify the detection module. For example, the voltage comparison may be performed by a voltage comparator or a processor.

Further, the resistance of the reception sampling resistor R11 may be set to be equal to the resistance of the reference sampling resistor R21, thereby improving the equivalence between the receiving voltage value and the reference voltage value.

Figure 7:
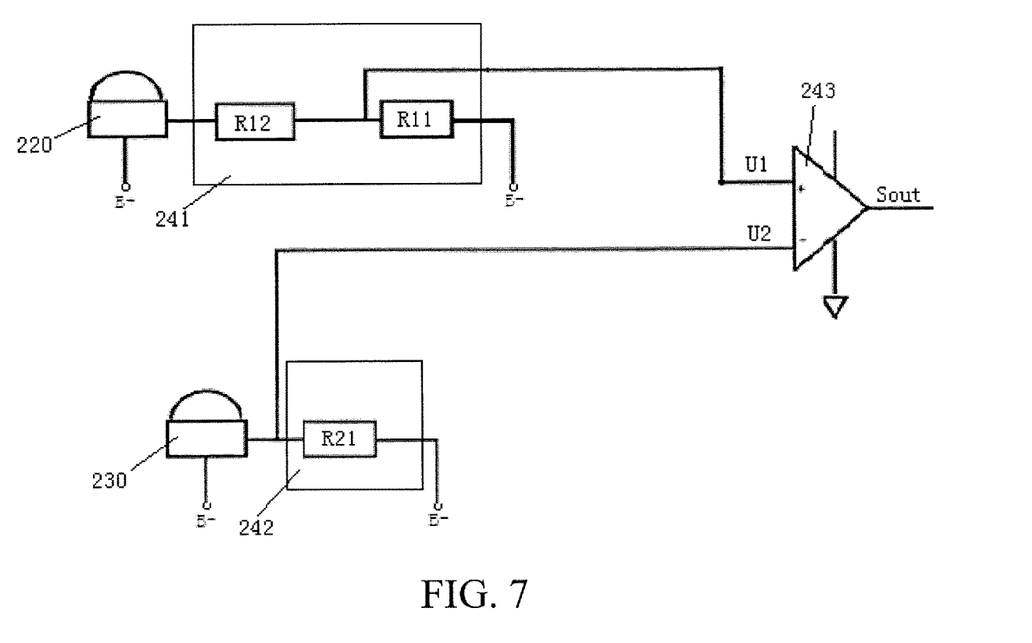
FIG. 7 is a schematic circuit diagram of an infrared obstacle detection device according to another embodiment of the present invention.

FIG. 7 is a schematic circuit diagram of an infrared obstacle detection device according to another embodiment of the present invention.

The embodiment shown in FIG. 7 differs from the embodiment shown in FIG. 6 in that: the first reception processing circuit 241 further comprises a compensation resistor R12.

The compensation resistor R12 is serially connected between the first reception module 220 and the reception sampling resistor R11. One end of the compensation resistor R12 is connected to one end of the first reception module 220, and the other end of the compensation resistor R12 is connected to the first end of the reception sampling resistor R11. The first signal input end of the voltage comparison circuit 243 is connected to a line between the compensation resistor R12 and the reception sampling resistor R11.

The resistance of the compensation resistor R12 may be set according to an increase of the receiving voltage value caused by the first reception module 220 after receiving the reflected light IL2 of the lowest energy.

The resistance of the compensation resistor R12 may be less than the resistance of the reception sampling resistor R11.

According to this embodiment of the present invention, the receiving voltage value may be properly reduced by arranging the compensation resistor R12. In this way, when the first reception module 220 does not receive the reflected light IL2, even if the energy of the infrared light in the ambient light received by the first reception module 220 is different from the energy of the infrared light in the ambient light received by the second reception module 230, the receiving voltage value will be lower than the reference voltage value. In addition, the receiving voltage value will be higher than the reference voltage value only when the first reception module 220 receives the reflected light IL2. Therefore, the embodiment of the present invention has certain tolerance for the compatibility of the ambient light under which the first reception module 220 is located and the ambient light under which the second reception module 230 is located, thereby reducing the requirement for the structure setting and improving the accuracy of the infrared obstacle detection.

Figure 8:
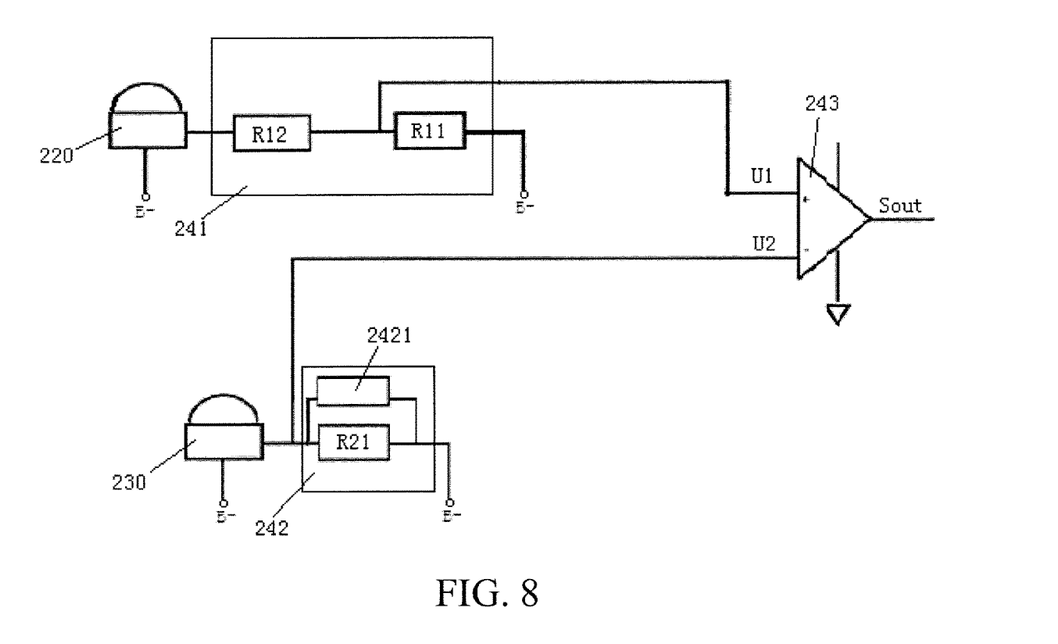
FIG. 8 is a schematic circuit diagram of an infrared obstacle detection device according to yet another embodiment of the present invention.

FIG. 8 is a schematic circuit diagram of an infrared obstacle detection device according to another embodiment of the present invention.

As shown in FIG. 8, this embodiment differs from the embodiment shown in FIG. 6 or FIG. 7 in that: the second reception processing circuit 242 may further comprise a validity detection circuit 2421.

The validity detection circuit 2421 is configured to output a signal indicating the failure of the device if the reference voltage value is higher than a set limit value.

The validity detection circuit 2421 may include a threshold circuit whose threshold level is set to be equal to the set limit value.

The validity detection circuit 2421 may also comprise a voltage comparator. The set limit value is input to one input end of the voltage comparator, such as an inverting input end of the voltage comparator. A reference voltage value is input to another input end of the voltage comparator, such as a non-inverting input end of the voltage comparator.

According to this embodiment of the present invention, the effective application range of the infrared obstacle detection performed by the device of the embodiment of the present invention is limited by detecting, through the validity detection circuit 2421, whether the reference voltage value is higher than the set limit value. On the one hand, the accuracy of the infrared obstacle detection may be ensured, and on the other hand, the control circuit for a moving object carrying the device can perform the subsequent processing according to the signal indicating the failure of the infrared obstacle detection, so as to ensure the normal operation of the moving object.

Example

In this example, the detection module 240 uses the circuit structure of the embodiment shown in FIG. 8.

In this example, the power supply source is a 5V DC power source. The resistances of the reception sampling resistor R11 and the reference sampling resistor R21 are 1K ohm respectively, and the resistance of the compensation resistor is 200 ohms.

In this example, a voltage comparator is adopted as the voltage comparator circuit 243. The receiving voltage value U1 is input to a non-inverting input end of the voltage comparator, and the reference voltage value U2 is input to an inverting input end of the voltage comparator.

(1) Indoor working environment: there is no sunlight at all. At this time, there is almost no influence from infrared light in ambient light.

In this working environment, the resistance of the second reception module 230 is very large and the reference voltage is 0 V.

Under this working environment, if there is no obstacle, the resistance of the first reception module 220 is also very large, the receiving voltage value is also 0V, and the voltage comparison circuit 243 outputs a low level signal, indicating that no obstacle is detected. If there is an obstacle, the first reception module 220 will receive the reflected light IL2, and in the case, the first reception module 220 is powered on to generate a photocurrent, the receiving voltage value will be larger than 0, and the voltage comparison circuit 243 outputs a high level signal, indicating that the obstacle is detected.

It can thus be seen that the device can work normally under this working environment.

(2) Normal working environment: there is influence from sunlight, but the energy value of the ambient light in the infrared light is lower than the energy value of the reflected light. In this case, the first reception module 220 and the second reception module 230 will be powered on to generate a photocurrent when there is no obstacle, and the resistances of the two modules at this time are about 1K ohm, respectively.

In the absence of an obstacle, the reference voltage value U2 is:

$$U2=1K\times 5V/(1K+1K)=2.5V.$$

In the absence of an obstacle, the receiving voltage value U1 is:

$$U1=1K\times 5V/(1K+1K+0.2K)=2.3V.$$

Therefore, under this working environment, if there is no obstacle, the voltage comparison circuit 243 outputs a low level signal and the device may work normally.

In the presence of an obstacle, the reference voltage value U2 is still 2.5 V, but the first reception module 220 will receive the reflected light IL2 to further increase the photocurrent, and the resistance decreases to about 200 ohms; in this case:

$$U1=1K\times 5V/(1K+0.2K+0.2K)=3.6V.$$

Therefore, under this working environment, if there is an obstacle, the voltage comparison circuit 243 will output a high level signal and the device may work normally.

(3) Extreme working environment: in this case, the sunlight is strong, so that the energy value of the infrared light in the ambient light is the same as the energy value of the reflected light IL2, and even higher than the energy value of the reflected light IL2.

In this working environment, since the energy of the infrared light in the ambient light is relatively large, the resistance of the second reception module 230 is unstable at this time. For example, the resistance of the second reception module 230 is between 0 ohms and 200 ohms. Therefore, the reference voltage value is also in a bouncing state, the reference voltage value corresponding to 0 ohm is 5 V, and the reference voltage corresponding to 200 ohms is 4.2 V. Similarly, the receiving voltage value will also be in a bouncing state. In this case, the detection accuracy can only be guaranteed if the receiving voltage value is synchronized and consistent with the beat generated by the infrared light in the ambient light.

It can thus be seen that, in this working environment, the device will not be able to provide a stable reference voltage value to be compared with the receiving voltage value, which may affect the detection accuracy. Therefore, in this example, the set limit value is set as 4V, such that a signal indicating the failure of the device is output when the reference voltage value is higher than 4V, so as to ensure the detection accuracy.

<Robot Embodiment>

Figure 9:
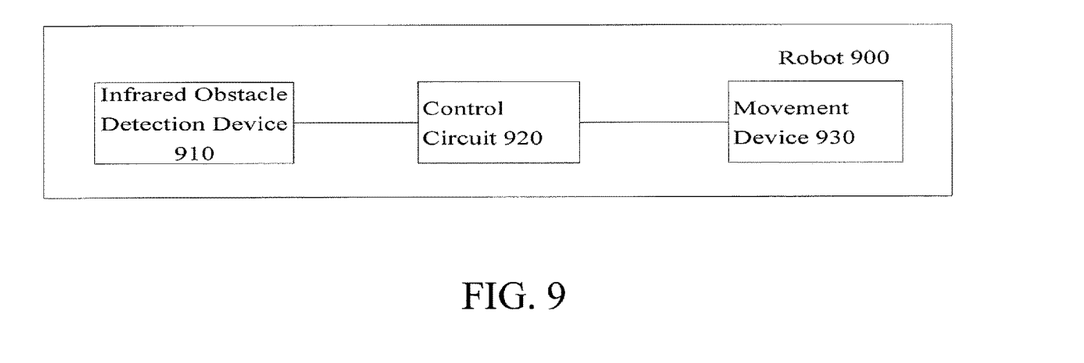
FIG. 9 is a schematic block diagram of a robot according to an embodiment of the present invention.

FIG. 9 is a schematic block diagram of a robot according to an embodiment of the present invention.

As shown in FIG. 9, a robot 900 according to an embodiment of the present invention comprises the infrared obstacle detection device according to any embodiment of the present invention, which is denoted by 910 in FIG. 9.

The infrared obstacle detection device 910 may provide a signal indicating that an obstacle is detected to a control circuit 920. The control circuit 920 may control a movement device 930 to move according to the signal.

The control circuit 920 may be a main control chip of the robot.

The infrared obstacle detection device 910 may be arranged independently of the control circuit 920, or at least part of the detection module 243, which implements the comparison, may be realized by the main control chip.

The movement device 930 may include a movement controller, a driver, a motor, and a movement actuator. The movement controller is configured to output control instructions to the driver. The driver outputs drive signals, such as PWM waves to the motor to control the motor to rotate. The motor drives the movement actuator to actuate through rotation, and then realizes the movement control of the robot.

The movement controller may also be integrated in a main control chip.

The robot according to the embodiment of the present invention may be a sweeping robot, a reception robot, a food delivery robot, a companion robot or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being emitory signals per se, such as radio waves or other freely propagating electromagnetic waves, electromagnetic waves propagating through a waveguide or other emission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper emission cables, optical emission fibers, wireless emission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. An infrared obstacle detection method, comprising the following steps:
controlling an emission module to radiate infrared light to the outside;
acquiring first infrared light received by a first reception module and second infrared light received by a second reception module, wherein the first reception module is disposed relative to the emission module such that the first infrared light comprises reflected light obtained by reflecting, by an obstacle, the infrared light radiated by the emission module to the outside and infrared light in ambient light, and the second reception module is disposed relative to the emission module such that the second infrared light is the infrared light in the ambient light; and comparing the first infrared light and the second infrared light, and determining that the obstacle is detected when an energy difference between the first infrared light and the second infrared light is larger than a preset threshold, wherein the emission module and the first reception module are arranged side by side in a first direction, and the first reception module and the second reception module are arranged side by side in a second direction, the first direction being perpendicular to the second direction, wherein a mounting base comprises a light shielding portion and a light transmission portion, wherein the emission module is mounted in the mounting base and radiates infrared light to the outside through the light transmission portion, wherein the light shielding portion is configured to limit a radiation range of the emission module in the second direction, wherein the light transmission portion has two end points in the second direction, wherein R is a length of a line segment between a light source point of the emission module and each of the two end points, and wherein a distance between the emission module and the first reception module in the first direction is larger than or equal to 3 R and less than or equal to 6 R.

2. The method according to claim 1, wherein the step of comparing the first infrared light and the second infrared light, and determining that the obstacle is detected when an energy difference between the first infrared light and the second infrared light is larger than a preset threshold comprises:

acquiring a receiving voltage value indicating an energy value of the first infrared light and a reference voltage value indicating an energy value of the second infrared light; and comparing the receiving voltage value and the reference voltage value, and outputting a signal indicating that the obstacle is detected when the receiving voltage value is larger than the reference voltage value.

3. The method according to claim 1, further comprising: detecting the energy value of the second infrared light, and outputting a signal indicating the failure of infrared obstacle detection when the energy value exceeds a set energy value upper limit.

4. The method according to claim 3, wherein the step of detecting the energy value of the second infrared light, and outputting a signal indicating the failure of infrared obstacle detection when the energy value exceeds a set energy value upper limit comprising:

acquiring the reference voltage value indicating the energy value of the second infrared light; and outputting a signal indicating the failure of infrared obstacle detection when the reference voltage value exceeds a set voltage value upper limit.

5. An infrared obstacle detection device, comprising:
an emission module, configured to radiate infrared light to the outside;
a first reception module, configured to receive first infrared light, wherein the first reception module is disposed relative to the emission module such that the first infrared light comprises reflected light obtained by reflecting, by an obstacle, the infrared light radiated by the emission module to the outside, and infrared light in ambient light;

a second reception module, configured to receive second infrared light, wherein the second reception module is disposed relative to the emission module such that the second infrared light is the infrared light in the ambient light; and a detection module, configured to compare the first infrared light and the second infrared light, and determine that the obstacle is detected when an energy difference between the first infrared light and the second infrared light is larger than a preset threshold, wherein the emission module and the first reception module are arranged side by side in a first direction, and the first reception module and the second reception module are arranged side by side in a second direction, the first direction being perpendicular to the second direction, wherein the infrared obstacle detection device further comprises a mounting base that comprises a light shielding portion and a light transmission portion, wherein the emission module is mounted in the mounting base and radiates infrared light to the outside through the light transmission portion, wherein the light shielding portion is configured to limit a radiation range of the emission module in the second direction, wherein the light transmission portion has two end points in the second direction, wherein R is a length of a line segment between a light source point of the emission module and each of the two end points, and wherein a distance between the emission module and the first reception module in the first direction is larger than or equal to 3 R and less than or equal to 6 R.

6. The device according to claim 5, wherein
a maximum dimension between the two end points of the light transmission portion in the second direction is $2 \times R \times \sin \theta$; a spacing between the first reception module and the second reception module in the second direction is larger than or equal to $2 \times T \times \tan \theta$, and less than or equal to $4 \times T \times \tan \theta$, wherein $\theta$ is a half power angle of the emission module, an included angle between the line segment and a normal direction of the light source point of the emission module is $\theta$, and T is a farthest detection distance of the first reception module and the emission module relative to the obstacle.

7. The device according to claim 5, wherein the detection module comprises a voltage comparison circuit, a first reception processing circuit connected to a first signal input end of the voltage comparison circuit, and a second reception processing circuit connected to a second signal input end of the voltage comparison circuit, wherein the first reception processing circuit is configured to convert an energy value of the first infrared light received by the first reception module into a receiving voltage value and output the receiving voltage value to the voltage comparison circuit, and the second reception processing circuit is configured to convert an energy value of the second infrared light received by the second reception module into a reference voltage value and output the reference voltage value to the voltage comparison circuit;

the first reception processing circuit comprises a reception sampling resistor whose first end is connected to one end of the first reception module and whose second end is connected to a cathode of a power supply source; the other end of the first reception module is connected to an anode of the power supply source; the first end of the reception sampling resistor is also connected to the first signal input end of the voltage comparison circuit;

the second reception processing circuit comprises a reference sampling resistor whose first end is connected to one end of the second reception module and whose second end is connected to the cathode of the power supply source; the other end of the second reception module is connected to the anode of the power supply source; the first end of the reference sampling resistor is also connected to the second signal input end of the voltage comparison circuit; and the voltage comparison circuit is configured to compare the receiving voltage value and the reference voltage value, and output a signal indicating that an obstacle is detected when the receiving voltage value is larger than the reference voltage value.

8. The device according to claim 5, wherein the detection module comprises the first reception processing circuit configured to convert the energy value of the first infrared light received by the first reception module into the receiving voltage value; the first reception processing circuit comprises the reception sampling resistor and a compensation resistor, wherein the first end of the reception sampling resistor is connected to one end of the first reception module, the second end of the reception sampling resistor is connected to the cathode of the power supply source, the other end of the first reception module is connected to the anode of the power supply source, and the voltage value at each of two ends of the reception sampling resistor is the receiving voltage value;

the compensation resistor is connected between the first reception module and the reception sampling resistor in series, wherein one end of the compensation resistor is connected to one end of the first reception module, and the other end of the compensation resistor is connected to the first end of the reception sampling resistor.

9. The device according to claim 5, wherein the detection module comprises the second reception processing circuit configured to convert the energy value of the second infrared light received by the second reception module into the reference voltage value;

the second reception processing circuit comprises a reference sampling resistor and a validity detection circuit, wherein the first end of the reference sampling resistor is connected to one end of the second reception module, the second end of the reference sampling resistor is connected to the cathode of the power supply source, the other end of the second reception module is connected to the anode of the power supply source, and the first end of the reference sampling resistor is also connected to the second signal input end of the voltage comparison circuit; the voltage value at each of two ends of the reference sampling resistor is used as the reference voltage value; the validity detection circuit is configured to output a signal indicating the failure of the device when the voltage value at each of two ends of the reference sampling resistor is higher than a set limit value.

10. A robot, comprising the infrared obstacle detection device according to claim 5.

11. The device according to claim 7, wherein the first reception processing circuit further comprises a compensation resistor, the compensation resistor is connected between the first reception module and the reception sampling resistor in series, wherein one end of the compensation resistor is connected to one end of the first reception module, and the other end of the compensation resistor is connected to the first end of the reception sampling resistor.

12. The device according to claim 7, wherein the second reception processing circuit further comprises a validity detection circuit, the validity detection circuit is configured to output a signal indicating the failure of the device when the voltage value at each of two ends of the reference sampling resistor is higher than a set limit value.

13. The robot according to claim 10, wherein the detection module comprises a voltage comparison circuit, a first reception processing circuit connected to a first signal input end of the voltage comparison circuit, and a second reception processing circuit connected to a second signal input end of the voltage comparison circuit, wherein the first reception processing circuit is configured to convert an energy value of the first infrared light received by the first reception module into a receiving voltage value and output the receiving voltage value to the voltage comparison circuit, and the second reception processing circuit is configured to convert an energy value of the second infrared light received by the second reception module into a reference voltage value and output the reference voltage value to the voltage comparison circuit;

the first reception processing circuit comprises a reception sampling resistor whose first end is connected to one end of the first reception module and whose second end is connected to a cathode of a power supply source; the other end of the first reception module is connected to an anode of the power supply source; the first end of the reception sampling resistor is also connected to the first signal input end of the voltage comparison circuit;

the second reception processing circuit comprises a reference sampling resistor whose first end is connected to one end of the second reception module and whose second end is connected to the cathode of the power supply source; the other end of the second reception module is connected to the anode of the power supply source; the first end of the reference sampling resistor is also connected to the second signal input end of the voltage comparison circuit; and the voltage comparison circuit is configured to compare the receiving voltage value and the reference voltage value, and output a signal indicating that an obstacle is detected when the receiving voltage value is larger than the reference voltage value.

14. The robot according to claim 10, wherein the detection module comprises the first reception processing circuit configured to convert the energy value of the first infrared light received by the first reception module into the receiving voltage value; the first reception processing circuit comprises the reception sampling resistor and a compensation resistor, wherein the first end of the reception sampling resistor is connected to one end of the first reception module, the second end of the reception sampling resistor is connected to the cathode of the power supply source, the other end of the first reception module is connected to the anode of the power supply source, and the voltage value at each of two ends of the reception sampling resistor is the receiving voltage value;

the compensation resistor is connected between the first reception module and the reception sampling resistor in series, wherein one end of the compensation resistor is connected to one end of the first reception module, and the other end of the compensation resistor is connected to the first end of the reception sampling resistor.

* * * * *